United States Patent
Lucidarme et al.

(10) Patent No.: US 7,372,920 B2
(45) Date of Patent: May 13, 2008

(54) METHOD FOR DETECTING A SIGNAL AND RECEIVER SYSTEM FOR THE IMPLEMENTATION OF THE METHOD

(75) Inventors: Thierry Lucidarme, Montigny le Bretonneux (FR); Nidham Ben Rached, Paris (FR)

(73) Assignee: Alcatel Lucent, Paris (FR)

( * ) Notice: Subject to any disclaimer, the term of this patent is extended or adjusted under 35 U.S.C. 154(b) by 623 days.

(21) Appl. No.: 10/718,423

(22) Filed: Nov. 20, 2003

(65) Prior Publication Data
US 2004/0137850 A1 Jul. 15, 2004

(30) Foreign Application Priority Data
Dec. 4, 2002 (FR) .................................. 02 15273

(51) Int. Cl.
*H04L 27/06* (2006.01)
(52) U.S. Cl. .................... 375/340; 375/343; 455/67.14
(58) Field of Classification Search ................ 375/343, 375/224, 226, 227, 228, 340, 316, 377
See application file for complete search history.

(56) References Cited

U.S. PATENT DOCUMENTS

| | | | | |
|---|---|---|---|---|
| 5,652,715 A | * | 7/1997 | Hanson | ....................... 702/191 |
| 5,903,610 A | * | 5/1999 | Skold et al. | ................. 375/285 |
| 6,144,709 A | | 11/2000 | Jyrkkae et al. | |
| 2003/0063576 A1 | * | 4/2003 | DiFazio | ...................... 370/280 |

FOREIGN PATENT DOCUMENTS

EP   0 923 207   6/1999

OTHER PUBLICATIONS

TS 25.211 technical specification "Physical channels and mapping of transport channels onto physical channels (FDD)", version 5.2.0, release 5, published in Sep. 2002 by the 3GPP organization.

* cited by examiner

*Primary Examiner*—Temesghen Ghebretinsae
(74) *Attorney, Agent, or Firm*—Sughrue Mion, PLLC

(57) ABSTRACT

The method seeks a high-performance detection of a signal burst transmitted on the initiative of a sender on a radio channel listened to by a receiver system. The transmitted burst represents a predetermined digital sequence, serving for example to request access to a radio system or to ensure the synchronization of a radio interface. Channel parameters representing a statistical behavior of the radio channel are estimated and a detection magnitude is evaluated on the basis of the estimated channel parameters and of a correlation between a signal received at the receiver system and the predetermined digital sequence. The estimated channel parameters comprise moments of order greater than 2 of the gain on the radio channel.

14 Claims, 1 Drawing Sheet

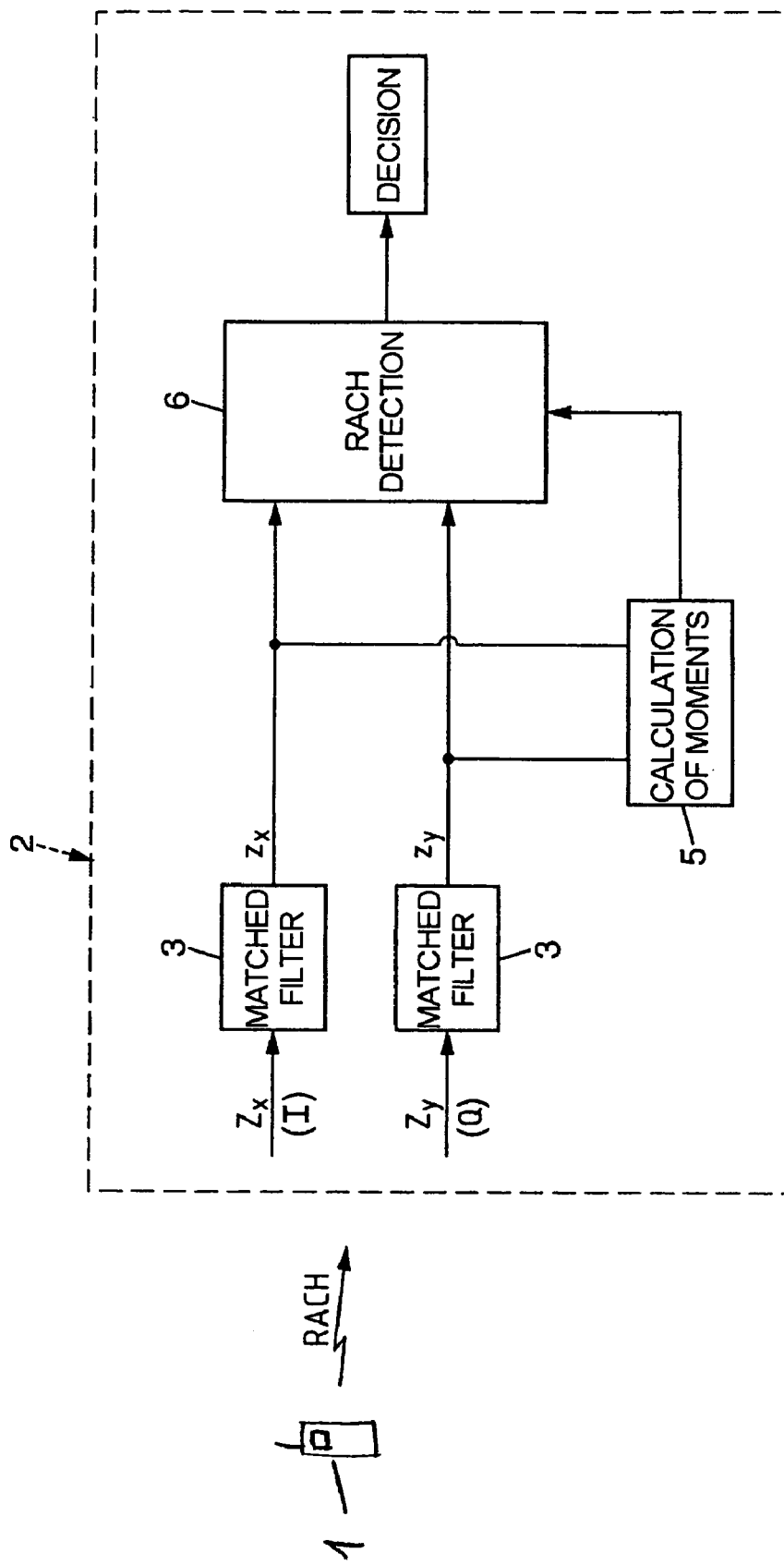

A power ramp can be used by the mobile terminal to regularly retransmit the burst for access to the network on the RACH channel, with increased transmission power for each new transmission, for as long as the network has not responded to its request for resources. This method makes it possible to improve the detection of the burst by the radio network, in particular in the case where the low transmission power of the first transmissions is the reason for the absence of detection of the burst on the RACH.

METHOD FOR DETECTING A SIGNAL AND RECEIVER SYSTEM FOR THE IMPLEMENTATION OF THE METHOD

BACKGROUND OF THE INVENTION

The present invention relates to the detection, by a receiver, of signal bursts transmitted on a radio channel in a communication system.

It finds an application in particular in the detection of short bursts sent in a radiocommunication network. These bursts may be of various types, such as initial-synchronization bursts or bursts of random access to the mobile network. The latter case will be more particularly developed hereinbelow, without this being limiting.

When a mobile terminal of a communication network wishes to avail itself of communication resources, for example to make a call, it executes a request to the network that manages and distributes the resources. This random access request generally consists in the transmission of a message whose preamble is a signal burst representing a predetermined digital sequence. This message is sent on an uplink radio channel listened to by a reception system of the network. In radiocommunication systems such as GSM ("Global System for Mobile communications") and UMTS ("Universal Mobile Telecommunication System"), this channel is called RACH or PRACH ("Packet Random Access CHannel"). The format of such a message is in particular described in section 5.2.2.2 of the TS 25.211 technical specification version 5.2.0 Release 5, "Physical channels and mapping of transport channels onto physical channels (FDD)", published in September 2002 by the 3GPP organization.

Reliable detection of random access bursts on the RACH is important since the communications setup failure rate seen by a mobile radio user depends directly thereon.

An improvement in the reliability of detection is particularly beneficial in respect of reception systems that comprise sectorial or omnidirectional smart antennas.

In the UMTS system, the predetermined digital sequence sent on the RACH channel by a mobile terminal has a size of 4096 "chips", a chip being an element of code in accordance with the coding used in the system. The data exchanged consist of 10 ms frames, themselves subdivided into 15 time intervals (or "slots") of 666 µs, corresponding to 2560 chips. Thus, the signal burst associated with the digital sequence sent on the RACH is received within an interval corresponding to two consecutive slots.

When the radio network wishes to determine whether a random access burst has been transmitted on an RACH channel, it calculates for the 1024 (=2×2560−4096) possible positions of the digital sequence of the burst within two consecutive slots, a correlation between the sequence as detected and the predetermined digital sequence which is known to the network.

A criterion must be defined to decide, on the basis of such a correlation, whether the predetermined digital sequence is present. This criterion is customarily based on the correlation's energy level which is compared with a predefined threshold level.

However, depending on the propagation conditions of the radio channel used, the signal received by the radio network is attenuated to a greater or lesser extent. It follows that the fixing of the threshold is tricky: too low a threshold gives rise to numerous false detections that disturb the system, whereas too high a threshold causes access requests originating from terminals relatively far from the base station to be missed.

However, through the repetition of the random access burst on the RACH, this method occupies the channel to the detriment of any requests from the other users. Furthermore, the high power of the signals thus repeated may create nuisance interference in the system.

An object of the present invention is to propose a method for detecting predefined signals which makes it possible to attenuate the drawbacks of the known methods.

Another object of the invention is to enhance the consideration of the propagation conditions on the radio channel so as to improve the detection of the transmitted bursts.

SUMMARY OF THE INVENTION

The invention thus proposes a method for detecting a signal burst transmitted on the initiative of a sender on a radio channel listened to by a receiver system, the transmitted burst representing a predetermined digital sequence, in which method channel parameters representing a statistical behavior of the radio channel are estimated and a detection magnitude is evaluated on the basis of the estimated channel parameters and of a correlation between a signal received at the receiver system and the predetermined digital sequence. According to the invention, said estimated channel parameters comprise moments of order greater than 2 of the gain on the radio channel.

Thus, the propagation conditions of the radio channel are finely considered, so as to detect the burst transmitted with increased reliability over a wide span of the attenuation that it is apt to undergo.

The invention also proposes a receiver system for the implementation of such a detection method.

BRIEF DESCRIPTION OF THE DRAWING

The single FIGURE is a diagram of a system implementing the invention.

DESCRIPTION OF PREFERRED EMBODIMENTS

Dealt with hereinbelow is the nonlimiting case of an embodiment of the invention applied to the detection of a signal burst of random access to a cellular radio network.

The mobile terminal 1 sends a signal burst over a RACH type channel when it wishes to access the network and obtain communication resources therefrom.

The network is composed mainly of a network core providing for the switching of the data and the connection to other communication networks, such as the PSTN ("Public Switched Telephone Network"), and of a radio network responsible for the exchanges of data and of signaling with mobile terminals.

The radio network generally comprises send and receive systems, belonging to base stations, as well as base station controllers providing for the functions of higher level than the simple transmission of the data, such as the management of radio resources or of mobility for example. Certain functions may be executed either by the base stations or by the base station controllers. Certain of them may also be performed in a shared manner by these entities.

The FIGURE shows a base station including a reception system 2 capable of receiving signals sent in particular by the terminal 1. In an advantageous but non-restrictive manner, certain of the functions performed by the reception system 2, which will be detailed hereinbelow, are the responsibility of the controller on which this base station depends. This controller 3 is called the BSC ("Base Station Controller") in the terminology used in the GSM system. In the UMTS system, the base station is sometimes dubbed "node B" and the base station controller is called the RNC ("Radio Network Controller").

The reception system 2 illustrated in the FIGURE comprises two main reception paths, in-phase (I) and quadrature (Q). The radio signal received is mixed with two quadrature radio waves at the carrier frequency. After low-pass filtering, the two components resulting therefrom form an in-phase signal $Z_x$ and a quadrature signal $Z_y$, respectively which, together, may be seen as constituting a complex signal $Z=Z_x+j.Z_y$.

The signal Z comprises the signals possibly sent by the mobile terminal 1 and also the residual signals consisting of noise and of interference. Given that the carrier frequencies are generally shared by several users, the signals transmitted by other mobile terminals constitute interference, similar to the noise in a CDMA system such as UMTS. At each instant the system 2 therefore receives signals $Z_x$, $Z_y$ consisting of digital sequences on each of the two paths I and Q.

The predetermined digital sequence represented by the random access burst is a sequence s of M samples (chips in a CDMA system) having a sufficient length to ensure detection under good conditions. In the case of UMTS, it is M=4096 chips, i.e. slightly more than a millisecond (the chip rate is 3.84 Mchip/s). To detect the possible presence of such a burst, the receiver system comprises two filters 3, respectively on the I and Q paths, which are matched to the predetermined sequence of chips, and which carry out the operation z=Z.s*, where (.)* denotes the complex conjugate. The complex signal $z=z_x+j.z_y$ produced by these filters 3 thus represents a correlation between the signal received and the sequence to be detected, calculated at the chip frequency. The two real signals $z_x$ and $z_y$, correspond respectively to the real and imaginary components of the signal detected after matched filtering.

Having detected the complex signal $z=z_x+j\ z_y$, the receiver system 2 performs a calculation to determine the likelihood according to which this signal z reveals the presence of the known digital sequence sent on the RACH by the mobile terminal 1.

Let H1 be the hypothesis according to which the random access burst was sent on the RACH channel and H0 the complementary hypothesis according to which only noise is present. The ratio of the probabilities based on knowing the detected signal z may be written as follows, according to Bayes' formula:

$$P(H1/z)/P(H0/z)=(P(z/H1)/P(z/H0))\times(P(H1)/P(H0)) \qquad (1)$$

where P(a/b) denotes the probability of a knowing b.

The receiver system 2 regards the burst as having been sent on the RACH if this ratio P(H1/z)/P(H0/z) is greater than a certain threshold c. Furthermore, the ratio $$\frac{P(H1)}{P(H0)} = \frac{P(H1)}{1-P(H1)}$$

is independent of the signal detected. The ratio P(H1/z)/P(H0/z) can be regarded as greater than the detection threshold c, if the ratio P(z/H1)/P(z/H0) is greater than a threshold c', such that c'=c×P(H0)/P(H1).

The receiver system 2 therefore evaluates the ratio of probabilities P(z/H1)/P(z/H0) to decide, by comparison with a threshold, whether a random access burst has or has not been detected on the RACH channel. This evaluation advantageously considers the propagation conditions on this channel.

The signal detected by the receiver system 2 subsequent to the sending of a burst may be written in the form Z=a.s+n, where a denotes the attenuation or gain of the propagation channel and n denotes the Gaussian white noise picked up by the system 2.

At the output of the filters 3 matched to the sequence s, the signal may then be written z=a.|s|²+n', where n'=n.s* also has the properties of Gaussian noise. Without affecting generality, the sequences s may be regarded as normed, i.e. |s|²=1.

The probability of detecting the signal z after matched filtering given that the predefined sequence was sent on the RACH can then be written:

$$P(z/H1) = \frac{1}{\sqrt{\pi N_0}} \cdot \int_C e^{-\frac{1}{N_0}\cdot|z-a|^2} \cdot p(a) \cdot da,$$

with C the set of possible realizations of the complex gain a on the propagation channel, $N_0$ the power of the noise and p(a) the probability density of the gain a. Likewise, the probability of detecting the signal z after matched filtering given that noise alone was received can be written:

$$P(z/H0) = \frac{1}{\sqrt{\pi N_0}} \cdot e^{-\frac{1}{N_0}\cdot|z|^2}.$$

From this we deduce the relation:

$$\frac{P(z/H1)}{P(z/H0)} = \int_C e^{-\frac{1}{N_0}\cdot(|a|^2-2\cdot\text{Re}(za^*))} \cdot p(a) \cdot da \qquad (2)$$

If the signal z is expanded according to its two components for each of the two paths, we have $z=z_x+j\ z_y$. Likewise, the gain of the propagation channel a can be written in the form: $a=a_x+j\ a_y$. The independence of the two random variables $a_x$ and $a_y$ makes it possible to factorize the probability density p(a) into the form: $p_x(a_x)\cdot p_y(a_y)$ and to write:

$$\frac{P(z/H1)}{P(z/H0)} = \int_C e^{-\frac{1}{N_0}\cdot(a_x^2+a_y^2-2(z_x a_x+z_y a_y))} \cdot p_x(a_x)p_y(a_y) \cdot da_x da_y \qquad (3)$$

$$= \left(\int_R e^{-\frac{1}{N_0}\cdot(a_x^2-2z_x a_x)} \cdot p_x(a_x) \cdot da_x\right).$$

-continued
$$\left( \int_R e^{-\frac{1}{N_0}(a_y^2 - 2z_y a_y)} \cdot p_y(a_y) \cdot d a_y \right)$$

where R denotes the set of real numbers.

Moreover, the Hermite polynomials are polynomials of order n, n being a natural integer, which satisfy the following differential equation:

$-H_n''(x) + 2x \cdot H_n'(x) = 2n \cdot H_n(x)$.

The first few Hermite polynomials, for orders going from 0 to 5 are the following:

$H_0(x) = 1$; $H_1(x) = 2x$;
$H_2(x) = 4x^2 - 2$; $H_3(x) = 8x^3 - 12x$;
$H_4(x) = 16x^4 - 48x^2 + 12$; $H_5(x) = 32x^5 - 160x^3 + 120x$.

These polynomials satisfy the equation:

$$e^{2uv - u^2} = \sum_{n=0}^{\infty} H_n(v) \cdot \frac{u^n}{n!},$$

so that we may write:

$$\int_R e^{-\frac{1}{N_0}(a_x^2 - 2z_x a_x)} \cdot p_x(a_x) \cdot d a_x =$$

$$\int_R \left( \sum_{n=0}^{\infty} \frac{1}{n!} \cdot H_n\left(\frac{z_x}{\sqrt{N_0}}\right) \cdot \left(\frac{a_x}{\sqrt{N_0}}\right)^n \right) \cdot p_x(a_x) \cdot d a_x =$$

$$\sum_{n=0}^{\infty} \frac{1}{n!(\sqrt{N_0})^n} \cdot H_n\left(\frac{z_x}{\sqrt{N_0}}\right) \cdot ma_{x,n}$$

with $$ma_{x,n} = \int_R a_x^n \cdot p_x(a_x) \cdot d a_x$$

representing the moment of order n of the distribution of the in-phase component of the gain of the propagation channel. Likewise:

$$\int_R e^{-\frac{1}{N_0}(a_y^2 - 2z_y a_y)} \cdot p_y(a_y) \cdot d a_y = \sum_{n=0}^{\infty} \frac{1}{n!(\sqrt{N_0})^n} \cdot H_n\left(\frac{z_y}{\sqrt{N_0}}\right) \cdot ma_{y,n},$$

with $$ma_{y,n} = \int_R a_y^n \cdot p_y(a_y) \cdot d a_y$$

representing the moment of order n of the distribution of the quadrature component of the gain of the propagation channel.

Consequently, the probability ratio $P(z/H1)/P(z/H0)$ may be written:

$$\frac{P(z/H1)}{P(z/H0)} = \left( \sum_{n=0}^{\infty} \frac{1}{n!(\sqrt{N_0})^n} \cdot H_n\left(\frac{z_x}{\sqrt{N_0}}\right) \cdot ma_{x,n} \right) \cdot \left( \sum_{n=0}^{\infty} \frac{1}{n!(\sqrt{N_0})^n} \cdot H_n\left(\frac{z_y}{\sqrt{N_0}}\right) \cdot ma_{y,n} \right) \quad (4)$$

According to the invention, a calculation module 5 of the receiver system 2 estimates the moments $ma_{x,n}$ and $ma_{y,n}$ at the output of the matched filters 3 for each of the two reception paths respectively.

This evaluation is performed over a time interval referred to as the evaluation interval and which corresponds to a smaller number of chips than the number of possible positionings of the random access burst inside two consecutive slots. Returning to the case of UMTS, where there are 1024 possible positions of the burst inside two consecutive slots, it is possible to choose for example an evaluation interval corresponding to 32 chips.

The evaluation of the moments then consists in estimating the probability $p_x(a_x)$, $p_y(a_y)$ of finding each value of a component characteristic of the gain of the propagation channel $a_{x,n}$ and $a_{y,n}$ in the corresponding sample of the signal detected in the evaluation interval. These probabilities are then weighted by the $n^{th}$ power of the associated component value, before being summed, as is indicated by the formulae $$ma_{x,n} = \int_R a_x^n \cdot p_x(a_x) \cdot d a_x \text{ and } ma_{y,n} = \int_R a_y^n \cdot p_y(a_y) \cdot d a_y$$

respectively.

After each new evaluation, the module 5 for calculating the moments sends the result of its calculation to a module 6 for detecting the RACH of the receiver system 2. This module calculates the probability ratio $P(z/H1)/P(z/H0)$ by virtue of formula (4), truncating the summation to an order k for example of 3 to 7:

$$\frac{P(z/H1)}{P(z/H0)} = \left( \sum_{n=0}^{k} \frac{1}{n!(\sqrt{N_0})^n} \cdot H_n\left(\frac{z_x}{\sqrt{N_0}}\right) \cdot ma_{x,n} \right) \cdot \left( \sum_{n=0}^{k} \frac{1}{n!(\sqrt{N_0})^n} \cdot H_n\left(\frac{z_y}{\sqrt{N_0}}\right) \cdot ma_{y,n} \right).$$

This calculation is straightforward since the moments $ma_{x,n}$ and $ma_{y,n}$ have been provided by the module 5. The variance $N_0$ of the noise is conventionally available in the receiver, on the basis of an average of the energy of the complex signal at the output of the matched filters 3.

It is particularly advantageous for the number k to be greater than 2, so as to consider the moments of high order that finely convey the behavior of the channel. The detection module 6 can store tables giving the certain typical values, the corresponding value for the Hermite polynomials. This enables the value of the ratio P(z/H1)/P(z/H0) to be easily determined for any new detected value of $Z_x$ and $Z_y$ inside the moments evaluation interval.

The probability ratio thus determined is then compared by the detection module 6 with a threshold c' for example fixed according to an RACH detection reliability objective. If the ratio P(z/H1)/P(z/H0) is greater than c' (this corresponding to the fact that the ratio P(H1/z)/P(H0/z) itself exceeds a certain threshold as was seen above), the receiver system 2 then regards the predefined sequence as having been sent on the RACH channel. It will thus be possible for resources to be made available to the requester terminal.

In the converse case, where the ratio P(z/H1)/P(z/H0) is less than c', the reception system 2 may decide to conclude that no sequence has been sent on the RACH channel.

Of course, in the case where the decision of the receiver system 2 is erroneous, for example if it ignores a request sent by the terminal 1 on the RACH, the terminal, which does not receive the expected response, can apply a method of repetition to improve the reliability of detection by the receiver system 2, for example by implementing a power ramp.

As was indicated earlier, the invention applies also to any other type of signal transmitted within a reception window of greater size than that of the digital sequence associated with the signal transmitted. For example, it may be applied to the detection of a synchronization message transmitted by a base station for the attention of a mobile terminal on an SCH channel ("Synchronization Channel") in a GSM or UMTS system for example. The SCH is described in section 5.3.3.5 of the aforesaid technical specification TS 25.211. It consists of two subchannels: a primary SCH and a secondary SCH. Each of these subchannels can carry messages of 256 chips, hence of much smaller size than that of a slot (2560 chips).

In this case, the sender on the SCH channel is a base station of the radio network, whereas the receiver system such as described above forms part of a mobile terminal. The burst belongs to a radio signal sequence sent periodically to synchronize the two ends of the radio link. The reliability of estimation of the moments $ma_{x,n}$ and $ma_{y,n}$ is strengthened thereby since the moments are then estimated over a duration that may be longer than in the case of the RACH channel, that is to say a duration covering several periods of the radio signal sequence sent on the SCH channel. A duration of the order of that for which the channel may be regarded as stationary (<100 ms) will typically be chosen. In UMTS, the predefined burst sent on the SCH channel represents around 10% of each slot. It is for example possible to calculate the moments over five frames, i.e. 50 ms or 75 slots.

It should also be noted that the present invention applies also to any other type of radiocommunication system where detection of the signals transmitted is necessary (radar for example).

In another advantageous embodiment, the receiver system used is a rake receiver, which comprises a certain number of "fingers" operating in parallel to estimate the digital symbols received. The gain in reception diversity results from the combining of the estimations obtained in the various fingers of the receiver.

In this case, a signal z containing a pilot sequence known to the receiver system is transmitted at predetermined instants. The signal may for example be transmitted on dedicated or common channels, traffic channels in particular. The receiver system then evaluates, for a certain number of fingers of the rake, moments $ma_{x,n}$ and $ma_{y,n}$ and a probability ratio P(z/H1)/P(z/H0) based on these moments.

When successive values of the ratio P(z/H1)/P(z/H0) have been obtained for each of these fingers, the latter then form the subject of a ranking so as to identify the fingers for which the signal transmitted was detected with a high correlation on the basis of the pilot sequence, that is to say the fingers that have a predominant contribution in the detection of the signals transmitted. The fingers thus identified may then be selected by the receiver system so as to be used during the subsequent receptions.

The invention claimed is:

1. A method for detecting a signal burst transmitted on the initiative of a sender on a radio channel listened to by a receiver system, the transmitted burst representing a predetermined digital sequence, in which method channel parameters representing a statistical behavior of the radio channel are estimated and a signal burst detection magnitude is evaluated on the basis of the estimated channel parameters and of a correlation between said signal burst as received at the receiver system and the predetermined digital sequence, wherein said estimated channel parameters comprise moments of order greater than 2 of the gain on the radio channel.

2. The method as claimed in claim 1, in which the signal received is subjected to a filtering matched to the predetermined digital sequence so as to obtain said correlation in the form of a complex signal having a first component on an in-phase path and a second component on a quadrature path.

3. The method as claimed in claim 2, in which the evaluated detection magnitude is proportional to $$\left(\sum_{n=0}^{k} \frac{1}{n!\left(\sqrt{N_0}\right)^n} \cdot H_n\left(\frac{z_x}{\sqrt{N_0}}\right) \cdot ma_{x,n}\right) \cdot$$

$$\left(\sum_{n=0}^{k} \frac{1}{n!\left(\sqrt{N_0}\right)^n} \cdot H_n\left(\frac{z_y}{\sqrt{N_0}}\right) \cdot ma_{y,n}\right),$$

where $N_0$ denotes the estimated power of the noise on the radio channel, $z_x$ and $z_y$ denote said first and second components, $ma_{x,n}$ and $ma_{y,n}$ denote the moments of order n of the gain on the in-phase path and on the quadrature path respectively, $H_n$ denotes the Hermite polynomial of order n and k is an integer larger than 2.

4. The method as claimed in claim 1, in which said sender is a mobile terminal, said receiver system belongs to a radiocommunication network and in which said burst is sent so as to request access to the network.

5. The method as claimed in claim 1, in which said sender comprises a base station of a radiocommunication network, said receiver system forms part of a mobile terminal, and in which said burst is sent for the temporal synchronization between the sender and the receiver system.

6. The method as claimed in claim 1, in which the detection of the burst is utilized to select fingers of a rake receiver.

7. The method as claimed in claim 1, in which the burst belongs to a radio signal sequence sent periodically, and in which said moments are estimated over a duration covering several periods of said radio signal sequence.

8. A radio receiver system capable of detecting a signal burst transmitted on the initiative of a sender on a radio channel listened to by the receiver system, the transmitted burst representing a predetermined digital sequence, the receiver system comprising means for estimating channel parameters representing a statistical behavior of the radio channel and means for evaluating a signal burst detection magnitude on the basis of the estimated channel parameters and of a correlation between said signal burst as received at the receiver system and the predetermined digital sequence, wherein said estimated channel parameters comprise moments of order greater than 2 of the gain on the radio channel.

9. A radio receiver system as claimed in claim 8, further comprising means for subjecting the received signal to a filtering matched to the predetermined digital sequence so as to obtain said correlation in the form of a complex signal having a first component on an in-phase path and a second component on a quadrature path.

10. A radio receiver system as claimed in claim 9, in which the evaluated detection magnitude is proportional to $$\left(\sum_{n=0}^{k} \frac{1}{n!\left(\sqrt{N_0}\right)^n} \cdot H_n\left(\frac{z_x}{\sqrt{N_0}}\right) \cdot ma_{x,n}\right) \cdot$$

$$\left(\sum_{n=0}^{k} \frac{1}{n!\left(\sqrt{N_0}\right)^n} \cdot H_n\left(\frac{z_y}{\sqrt{N_0}}\right) \cdot ma_{y,n}\right),$$

where $N_0$ estimated power of the noise on the radio channel $z_x$ and $z_y$ denote said first and second components, $ma_{x,n}$ and $ma_{y,n}$ denote the moments of order n of the gain on the in-phase path and on the quadrature path respectively, $H_n$ denotes the Hermite polynomial of order n and k is an integer larger than 2.

11. A radio receiver system as claimed in claim 8, belonging to a radiocommunication network, said sender being a mobile terminal, and said burst being sent so as to request access to the network.

12. A radio receiver system as claimed in claim 8, forming part of a mobile terminal, said sender comprising a base station of a radiocommunication network, and said burst being sent for the temporal synchronization between the sender and the receiver system.

13. A radio receiver system as claimed in claim 8, further comprising means for utilizing the detection of the burst to select fingers of a rake receiver.

14. radio receiver system as claimed in claim 8, in which the burst belongs to a radio signal sequence sent periodically, and in which said moments are estimated over a duration covering several periods of said radio signal sequence.

* * * * *